Aug. 19, 1969   J. MELZER   3,461,541
PROCESS AND APPARATUS FOR MAKING A CONTINUOUS LAMINATED
STRUCTURE HAVING A CORRUGATED LAYER
Filed Sept. 27, 1965   2 Sheets-Sheet 1
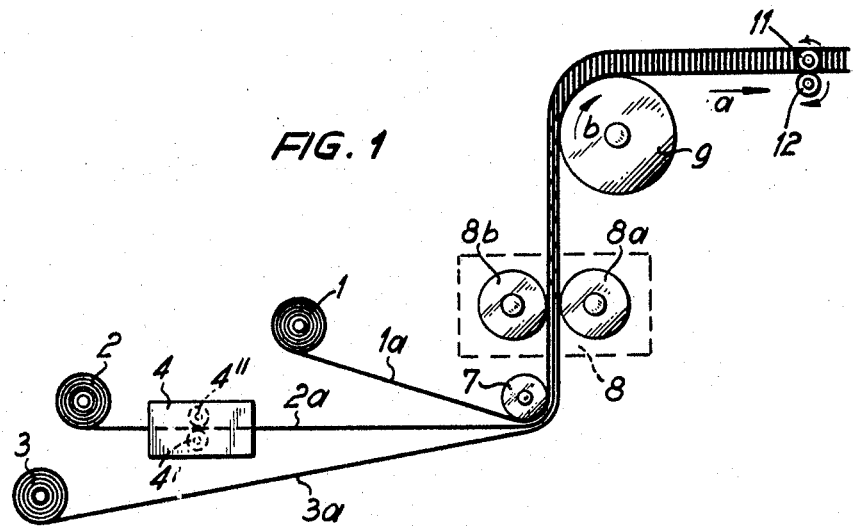
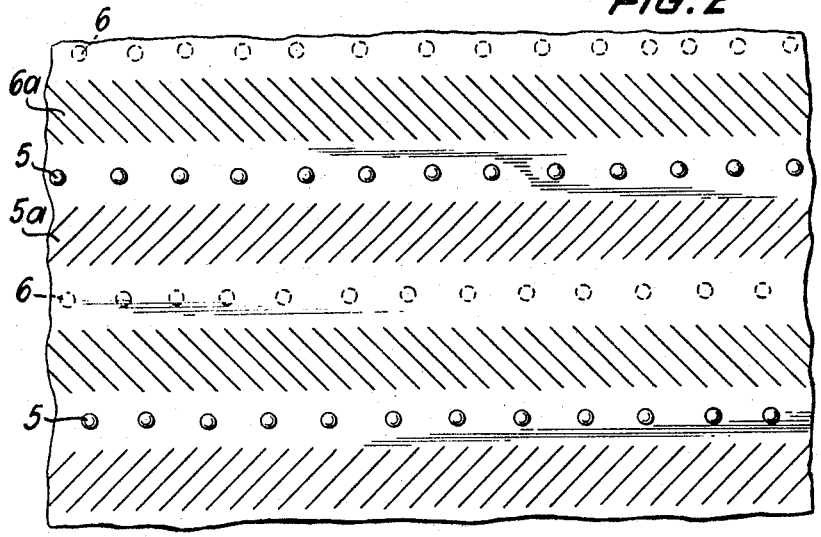
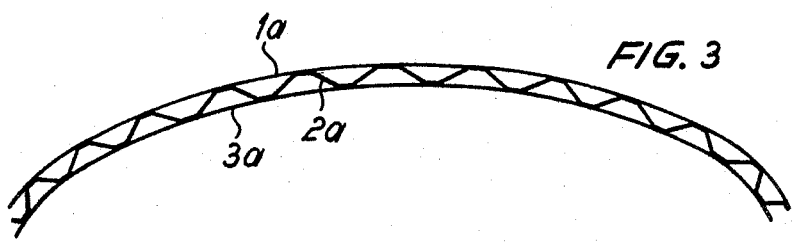
INVENTOR
Jean Melzer Aug. 19, 1969    J. MELZER    3,461,541
PROCESS AND APPARATUS FOR MAKING A CONTINUOUS LAMINATED
STRUCTURE HAVING A CORRUGATED LAYER
Filed Sept. 27, 1965    2 Sheets-Sheet 2
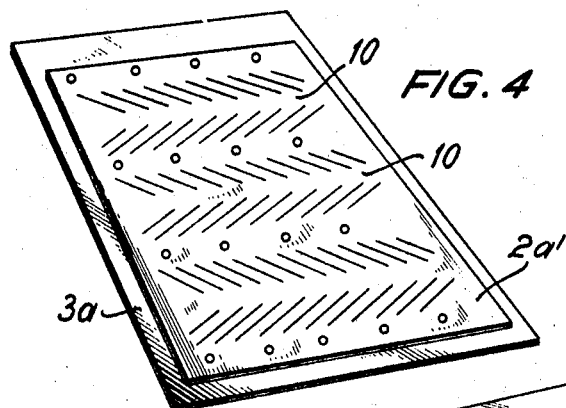
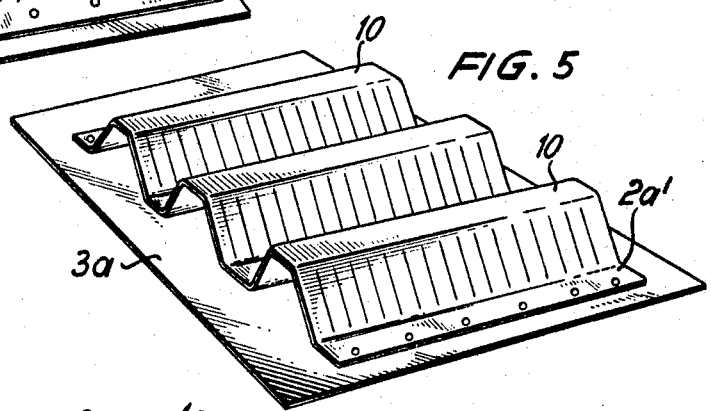
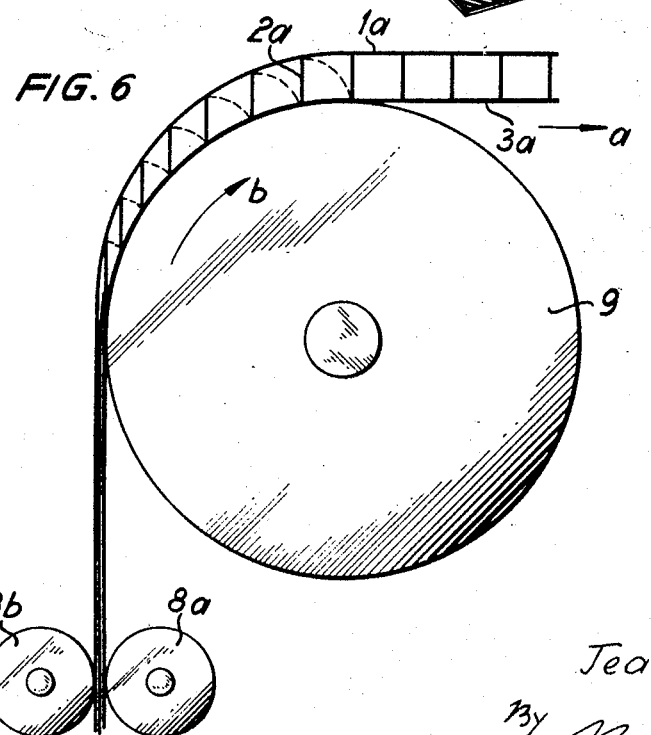
INVENTOR
Jean Melzer United States Patent Office 3,461,541
Patented Aug. 19, 1969

3,461,541
PROCESS AND APPARATUS FOR MAKING A CONTINUOUS LAMINATED STRUCTURE HAVING A CORRUGATED LAYER
Jean Melzer, 36 Vogler Strasse, Weinheim an der Bergstrasse, Germany
Filed Sept. 27, 1965, Ser. No. 490,471
Claims priority, application Germany, Sept. 26, 1964, M 62,578
Int. Cl. B21d *39/00;* B23p *19/04*
U.S. Cl. 29—455      5 Claims

ABSTRACT OF THE DISCLOSURE

A honeycomb sandwich plate is made by superimposing three continuous metal sheets, the middle sheet carrying a herringbone pattern of transversely spaced longitudinal rows of slots. The slots are parallel to each other in each row and obliquely inclined relative to the direction of sheet elongation, the direction of inclination alternating in successive rows. The imperforate strips of the middle sheet between the slots are alternatingly welded to the top and bottom sheets respectively, and the welded laminate is moved arcuately over an idler roller by tension applied to the bottom sheet, whereby the middle sheet is expanded. The top sheet may be omitted.

---

This invention relates to a process for making honeycomb-core sandwich plates and similar laminated structures having a corrugated layer in continuous lengths, and to apparatus for performing the process.

It is known to fasten three superimposed metal sheets to each other in such a manner that the suitably pretreated core sheet interposed between the two facing sheets expands when the facing sheets are moved relative to each other in opposite directions parallel to their exposed faces. Portions of the core sheet are tilted thereby to form webs which connect the two facing sheets.

The deformation of the core sheet requires a force which is approximately proportional to the overall size of the honeycomb sandwich plate under otherwise identical conditions. The force that can be applied to the facing sheets for expanding the core sheet is limited by the mechanical strength of the facing sheets. This limits the size of the plates that can be made by the known method. It has not been possible heretofore to produce honeycomb sandwich plates of the type described in a truly continuous operation because of this limitation.

The object of the invention is the provision of a process and apparatus for making honeycomb sandwich plates and similar structures in a fully continuous operation so that the plates may be produced continuously in any desired length.

In one of its aspects, the invention resides mainly in a process in which a first elongated sheet is superimposed on a second such sheet, and corresponding superimposed portions of the sheets are fastened to each other. The fastened portions extend in the direction of sheet elongation and are transversely spaced from each other. The superimposed fastened sheets are moved in a path having two approximately straight portions connected by an arcuate portion whose axis of curvature is so located that the first sheet is nearer the axis than the second sheet, whereby the second sheet moves over a longer distance than the first sheet and is stretched between the fastened portions as the first sheet is tensioned during movement in the arcuate path portion. When the two sheets reach the straight path portion following the arcuate portion, the second sheet buckles as its fastened portions move toward each other, and assumes a corrugated shape.

The exact nature of this invention as well as other objects and advantages thereof will be readily apparent from consideration of the following specification relating to the annexed drawing in which:

FIG. 1 shows the essential working elements of preferred apparatus for performing the method of the invention, the view being in side elevation, and largely conventional;

FIG. 2 illustrates a pattern formed on a core sheet processed in the apparatus of FIG. 1;

FIG. 3 shows a honeycomb sandwich plate that may be produced by somewhat modifying the apparatus of FIG. 1, the view being in transverse section;

FIG. 4 is a perspective view of two sections of superimposed sheets intended to form a laminated structure having a corrugated layer;

FIG. 5 shows the product made from the sheets of FIG. 4 in a corresponding view; and FIG. 6 shows a detail of FIG. 1 on a larger scale.

Referring now to the drawing in detail, and initially to FIG. 1, there are seen three coils 1, 2, 3 of sheet metal strip from which continuous lengths of metal sheet 1a, 2a, 3a are being unwound. The sheet 2a passes through a shaping device 4 having two driven shaping rolls 4', 4" which form a pattern on the sheet 2a better seen in FIG. 2.

The pattern consists of rows of indentations 6, projections 5 and slots 6a, 5a. The rows extend lengthwise of the sheet 2, and a row of indentations 6 is followed in transverse sequence by a row of slots 6a obliquely inclined to the right from the direction of sheet movement, a row of projections 5, and a row of slots 5a, obliquely inclined to the left, as viewed in FIG. 2, whereupon the pattern is repeated. The projections 5 and indentations 6 are approximately hemispherical, and projections on one face of the sheet 2 correspond to indentations on the other face and vice versa.

The three sheets 1a, 2a, 3a are superimposed by joint movement over an idler roller 7, which guides the superimposed sheets straight through the gap between the contact rollers 8a, 8b of a resistance welding machine 8, not otherwise shown in detail. Contact between the sheets is limited to the projections on the two faces of the core sheet 2a, and the heavy current of the welding machine passes from the roller 8a through the facing sheet 3a, the core sheet 2a, the facing sheet 1a, to the contact roller 8a, whereby the projections on the core sheet 2a are welded to the facing sheets.

The welded laminated structure is next guided by an idler roller 9 in an arcuate path in which the facing sheet 3a travels in an arc of smallest radius about the axis of the roller while the sheet 1a travels in the widest arc. The laminated structure is moved over the surface of the guide roller 9 through an angle of 90° by a pair of punch rolls 11, 12 which engage lateral edges of the sheet 3a, the sheet 3a being somewhat wider than the sheets 2a, 1a, and tension the sheet 3a in the direction of the arrow a.

The differential angular velocity of the sheets 1a, 3a in the arcuate path about the roller 9 causes the core sheet 2a to be expanded while the same travels over the roller 9. Expansion occurs continuously in the arcuate path portion, and is limited to that path portion. The pulling force selectively applied by the pinch rolls 11, 12 thus is constant and limited regardless of the ultimate length of the honeycomb sandwich plate which is being produced.

The manner in which the core sheet 2a is expanded is evident from FIG. 2 when taking into consideration that the projections, not visible in FIG. 2, which correspond to the indentations 6 are welded to the facing sheet 3a, the projections 5 are welded to the facing sheet 1a, and the facing sheet 3a is tensioned toward the right, as viewed in FIG. 2, relative to the sheet 1a during the movement of the welded laminated structure over the roller 9.

The change in the position of individual elements of the sheet 2a during movement over the surface of the roller 9 in the direction of the arrow b is indicated by arcs in broken lines in FIG. 6.

When only two sheets are passed through the apparatus of FIG. 1 there is obtained a laminated structure having one smooth and one corrugated layer as seen in FIGS. 4 and 5. FIG. 4 shows superimposed sections of the sheets 2a' and 3a as they emerge from the welding apparatus 8. The sheet 2a' differs from the afore-described sheet 2a in being formed with rows of projections or indentations in transverse sequence after each pair of slots, thereby leaving a smooth-surfaced elongated sheet area 10 between the two rows of slots.

When the welded structure moves in an arc about the roller 9, and then enters the straight path portion leading to the pinch rolls 11, 12, the slotted sheet 2a' buckles in the manner shown in FIG. 5. The plate of which a short section is seen in FIG. 5 provides a firmly adhering facing for foam concrete or foam plastic.

When the roller 9 in the apparatus of FIG. 1 varies in diameter over its axial length, the expansion of the core sheet 2a varies over the width of the sheet, and there may be produced a continuous laminar structure of the cross sectional shape illustrated in FIG. 3. It is suitable for the roofs of cars and similar applications.

It should be understood, of course, that the foregoing disclosure relates only to preferred embodiments of the invention, and that it is intended to cover all changes and modifications of the examples of the invention herein chosen for the purpose of the disclosure which do not constitute departures from the spirit and scope of the invention set forth in the appended claims.

What is claimed is:

1. A process for making a continuous laminated structure having a corrugated layer, which comprises:
   (a) superimposing a first elongated sheet member on one of the two faces of a second elongated sheet member,
      (1) said second sheet member being formed with a multiplicity of slots,
      (2) the slots in said sheet member constituting a plurality of pairs of rows extending longitudinally of said second sheet member,
      (3) the slots of each row being substantially parallel to each other and obliquely inclined to the direction of elongation of said second sheet member and to the slots of the other row of the pair,
      (4) said rows being spaced from each other in a direction transverse of said direction of elongation and defining longitudinal strip portions of said second sheet member therebetween;
   (b) fastening the strip portions between the rows of each pair of rows to corresponding superimposed portions of said first sheet member;
   (c) moving the superimposed fastened sheet members in a longitudinal path having two substantially straight portions and an arcuate portion intermediate said substantially straight portions,
      (1) said arcuate portion having an axis of curvature extending in said transverse direction, said first sheet member being nearer said axis in said arcuate path portion than said second sheet-member; and
   (d) longitudinally tensioning said first sheet member in the direction of movement while said sheet members move in said arcuate path portion, thereby causing permanent corrugating of said second sheet member.

2. A process as set forth in claim 1, wherein the slots of the two rows in each pair are inclined relative to said direction of elongation in opposite oblique directions.

3. A process as set forth in claim 1, wherein a third elongated sheet member is superimposed on the other face of said second sheet member, and superimposed portions of said third sheet member are fastened to corresponding portions of said second sheet member prior to said moving through said arcuate path portion, each of said corresponding portions of said second sheet member being interposed between the two rows of a respective pair of rows.

4. A process as set forth in claim 1, wherein said sheet members consist of metallic material, and said portions are fastened to each other by welding.

5. A process as set forth in claim 1, wherein said first sheet member is tensioned in said direction of movement relative to said second sheet member while the sheet members move in said arcuate path portion.

References Cited

UNITED STATES PATENTS

| 2,722,735 | 11/1955 | Beamish | 29—472.3 X |
| 3,046,638 | 7/1962 | Melzer | 29—455 X |
| 3,111,204 | 11/1963 | Phare | 29—155 X |
| 3,269,004 | 8/1966 | Smith et al. | 29—472.3 X |

JOHN F. CAMPBELL, Primary Examiner

C. E. HALL, Assistant Examiner

U.S. Cl. X.R.

29—155; 52—618; 156—197